(12) United States Patent
Saukko

(10) Patent No.: US 8,138,932 B2
(45) Date of Patent: Mar. 20, 2012

(54) METHOD AND APPARATUS FOR VERIFYING A LEAK IN CONNECTION WITH A FLOW INHIBITOR

(75) Inventor: Juha Saukko, Helsinki (FI)

(73) Assignee: ABB Oy, Helsinki (FI)

(*) Notice: Subject to any disclaimer, the term of this patent is extended or adjusted under 35 U.S.C. 154(b) by 355 days.

(21) Appl. No.: 12/470,651

(22) Filed: May 22, 2009

(65) Prior Publication Data

US 2009/0295588 A1    Dec. 3, 2009

(30) Foreign Application Priority Data

May 29, 2008  (FI) ...................................... 20085514

(51) Int. Cl.
*G08B 21/00* (2006.01)
(52) U.S. Cl. ............................ 340/605; 60/431; 60/476
(58) Field of Classification Search .................. 340/605; 60/390, 431, 476; 91/468; 137/2, 12
See application file for complete search history.

(56) References Cited

U.S. PATENT DOCUMENTS

| | | | | |
|---|---|---|---|---|
| 4,625,513 A | * | 12/1986 | Glomeau | 60/431 |
| 4,696,163 A | * | 9/1987 | Glomeau | 60/476 |
| 2003/0106582 A1 | * | 6/2003 | Jeong | 137/2 |

FOREIGN PATENT DOCUMENTS

| | | |
|---|---|---|
| FI | 20061019 A | 8/2008 |
| JP | 8-178805 A | 7/1996 |
| JP | 2001-065898 A | 3/2001 |
| RU | 2 312 208 C1 | 12/2007 |

OTHER PUBLICATIONS

Finnish Search Report (with English translation of Search Report categories) dated Nov. 17, 2008.

* cited by examiner

*Primary Examiner* — John A Tweel, Jr.
(74) *Attorney, Agent, or Firm* — Buchanan Ingersoll & Rooney PC

(57) ABSTRACT

Exemplary embodiments relate to a method for verifying a leak situation in a liquid transfer system a system and a control unit for implementing the method. The liquid is transferred with a frequency-converter-controlled pump from a lower pressure to a higher pressure and where liquid is prevented from being transferred from a higher pressure to a lower pressure with one or more check valves positioned in a pipe system. The method includes generating, for the frequency converter, motion information on the motion of the pump between the motion operations, and indicating a leak situation of the check valve if the direction of operation of the pump is, in the motion information, opposite to the direction of operation during the use of the pump.

8 Claims, 6 Drawing Sheets

METHOD AND APPARATUS FOR VERIFYING A LEAK IN CONNECTION WITH A FLOW INHIBITOR

BACKGROUND OF THE INVENTION

The invention relates to liquid pumping systems and particularly to verifying leak situations in such systems.

A check valve, also called a non-return valve, is very often used in connection with water pumps. Here, a check valves refers to a valve allowing flow in only one direction. Such check valves include, for instance, a non-return poppet valve and a non-return flap valve.

Solids carried by the water to be pumped may, however, cause a leak situation in such check valves. Impurities may be gathered for example in a system where the impurities of the water are gathered upon the non-return valves of a manifold when the valves are in a state preventing the flow. When liquid is transferred with a pump through such a non-return valve having been closed for long, the solids fall to the non-return valve mechanism immediately after the opening, possibly preventing the closing of the valve when the pumping has ended.

Verifying leaks caused by such check valves has proven difficult.

BRIEF DESCRIPTION OF THE INVENTION

An object of the invention is thus to provide a method and an apparatus implementing the method in such a way that the above problems can be solved. The object of the method is achieved with a method and a system which are characterized by what is stated in the independent claims. Preferred embodiments of the invention are disclosed in the dependent claims.

The invention is based on generating motion information on the motion of the pump for a frequency converter between pumping operations, and processing this motion information in the control unit of the frequency converter to identify and indicate a leak situation.

One object of the invention is a method for verifying a leak situation in a liquid transfer system.

A second object of the invention is a liquid transfer system for verifying a leak situation in this liquid transfer system.

A third object of the invention is a control unit of a frequency converter for verifying a leak situation in a liquid transfer system.

A leak situation is verified in a liquid transfer system where liquid is transferred with a frequency-converter-controlled pump from a lower pressure to a higher pressure and where liquid is prevented from being transferred from a higher pressure to a lower pressure with one or more check valves positioned in a pipe system. Motion information on the motion of the pump is generated for the frequency converter also between the pumping operations. Motion information on the rotation of the pump may be generated by means of appropriate sensors, for example. The sensors are positioned in such a way that the direction of rotation and the speed of the pump may be determined. The information of the sensors can be transferred to the frequency converter, whereby calculation means of the control unit of the frequency converter may carry out the required calculations and comparison. The leak situation of the check valve is indicated if the direction of operation of the pump is, in the motion information, opposite to the direction of operation during the use of the pump.

Indicating means here an alarm or activity enabling alarm. The frequency converter may give, from its output, a signal or supply voltage for example to an external device, which, in turn, alarms with a sound signal, light signal or both. In the case of a remote-controlled frequency converter, an alarm can be carried out in a leak situation to a monitoring room or the like.

According to one aspect, motion information is received by the control unit of the frequency converter and compared with leak criteria predetermined for the control unit of the frequency converter, and indication of a leak situation is carried out if, in addition to the direction of operation of the pump, at least one leak criterion is met. The leak criteria may, in addition to the direction of operation, include speed and the duration of unidirectional motion information.

According to a second aspect, comparison of motion information is started in a delayed manner after a pumping operation has ended, i.e. after a predetermined delay. This is a preferable way in systems where part of the liquid flows back after the pumping. This has the advantage that changing the delay allows unnecessary alarms to be prevented in various systems.

According to yet another aspect, the pump is used in a frequency-converter-controlled manner after the indication of the leak situation in such a way that motion opposite to the direction of operation during the use of the pump is prevented. In this way, the pump itself serves as a flow shut-off, and thus the damages caused by a leak can be reduced. Further, this activity may prevent a situation where the pump would be started when it is rotating in the opposite direction. Start-up in the opposite direction may damage the pump mechanism.

BRIEF DESCRIPTION OF THE FIGURES

The invention will now be described in more detail in connection with preferred embodiments of the invention, referring to the attached drawings, of which.

DETAILED DESCRIPTION OF THE INVENTION

Figure 1:
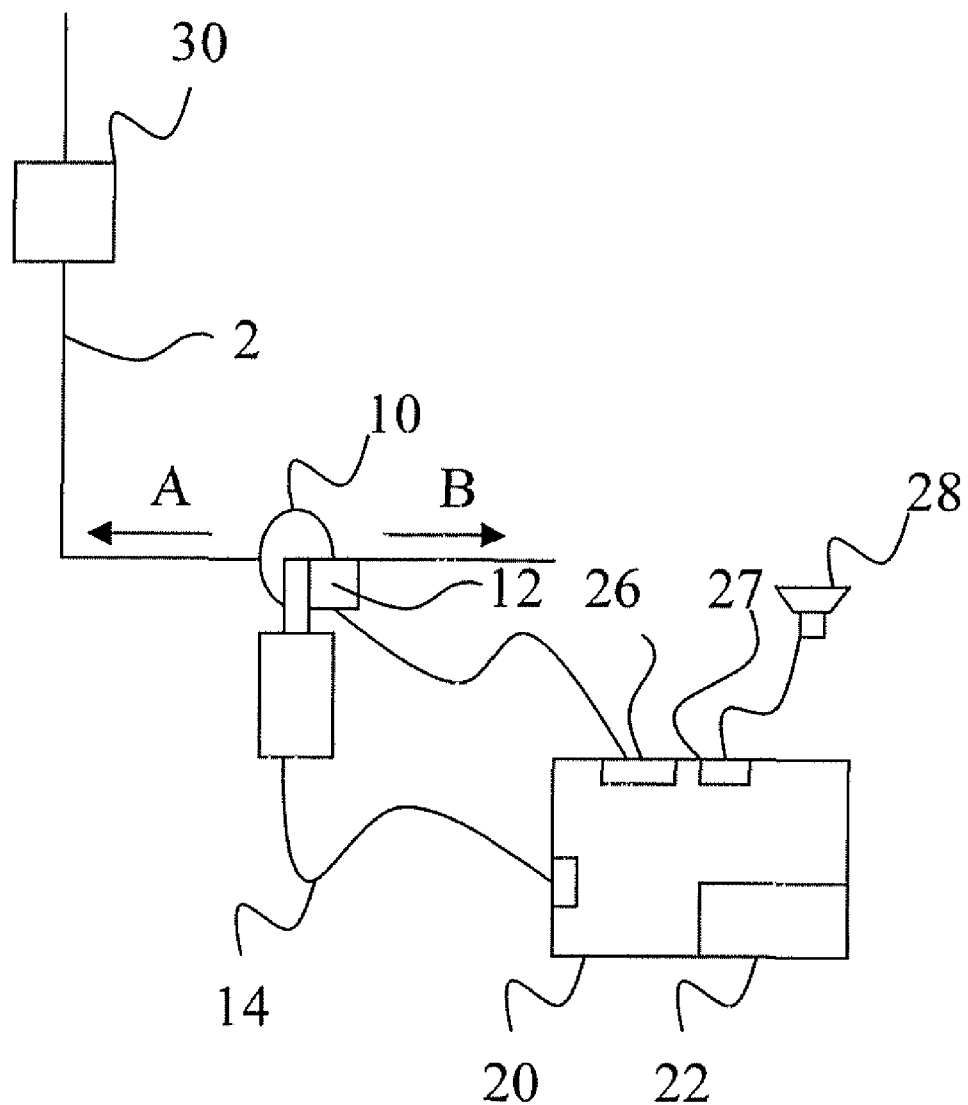
FIG. 1 shows one embodiment of a system according to the present invention.

FIG. 1 shows a system where liquid is transferred in a pipe system 2 from a lower pressure to a higher pressure by means of a pump 10 in the direction indicated by arrow A. The operation of the pump 10 is controlled with a frequency converter 20. Between the frequency converter 20 and the pump 10, there is cabling 14 with which the motor of the pump 10 is provided with supply current.

The pipe system 2 comprises a check valve 30, which prevents liquid from being transferred from a higher pressure to a lower pressure. A leak situation of the check valve 30 generates a flow in the direction of arrow B. The flow in the direction of arrow B causes the pump 10 to rotate correspondingly.

In connection with the pump 10, there are identifying means 12, such as motion sensors enabling determination of motion information, such as direction of rotation, duration and speed. The motion information is transmitted to an input 26 of the frequency converter 20 and through that to a control unit 22. The control unit 22 observes the motion of the pump 10 between the pumping operations and indicates in a predetermined manner in a leak situation. The control unit may indicate a leak situation for instance by giving a supply voltage to an output 27 of the frequency converter, which is, in turn, connected to an alarm device, which is here a sound signal device 28.

Figure 2:
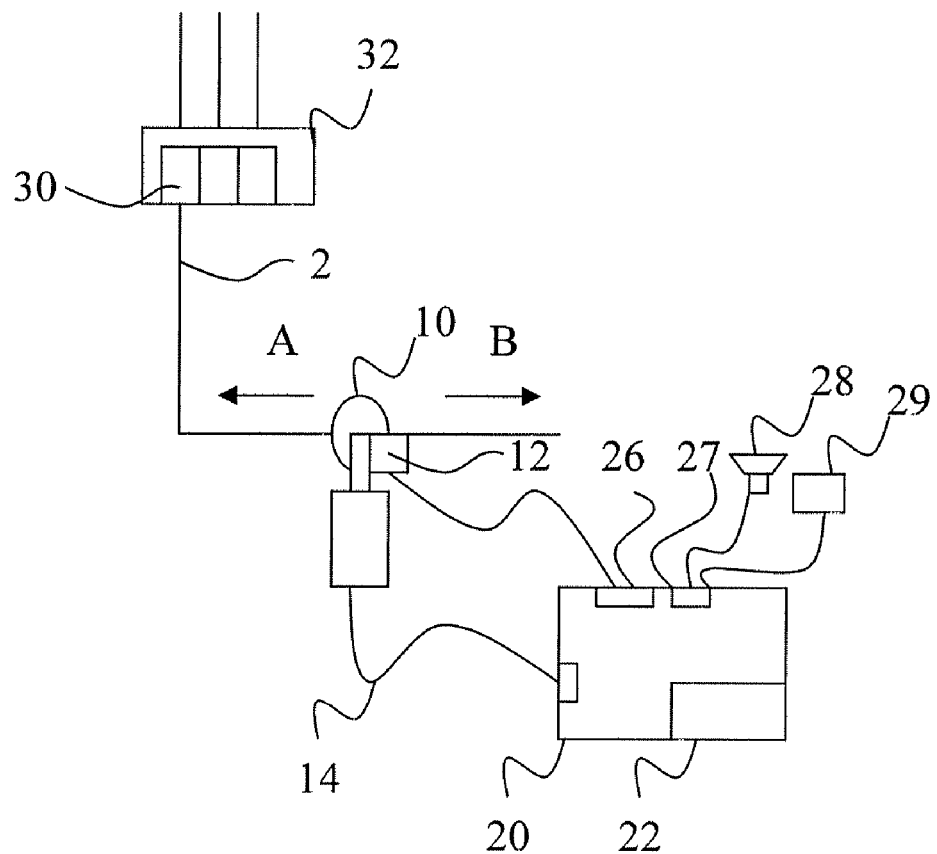
FIG. 2 shows a second embodiment of the system according to the present invention.

FIG. 2 shows a system where liquid is transferred in a pipe system 2 from a lower pressure to a higher pressure by means of the pump 10 in the direction of arrow A. The operation of the pump 10 is controlled with the frequency converter 20. Between the frequency converter 20 and the pump 10, there is cabling 14 with which the motor of the pump 10 is provided with supply current.

The pipe system 2 has several check valves which are connected to a manifold 30 and prevent liquid transfer from a higher pressure to a lower pressure. The leak situation of one check valve 30 causes a flow in the direction of arrow B. The flow in the direction of arrow B makes the pump 10 rotate correspondingly.

In connection with the pump 10, there are identifying means 12, such as motion sensors which allow motion information, such as direction of rotation, duration and speed, to be determined. The motion information is transmitted to the input 26 of the frequency converter 20 and through that to the control unit 22. The control unit 22 observes motion of the pump 10 between the pumping operations and indicates in a leak situation in a predetermined manner. The control unit may indicate a leak situation for example by giving a supply voltage to the output 27 of the frequency converter, which is, in turn, connected to alarm devices, which are here a sound signal device 28 and an alarm transmission device 29, such as a robot telephone.

FIGS. 3 to 6 show alternatives for verifying a leak situation in the control unit of a frequency converter, implementable with software means of the control unit.

Figure 3:
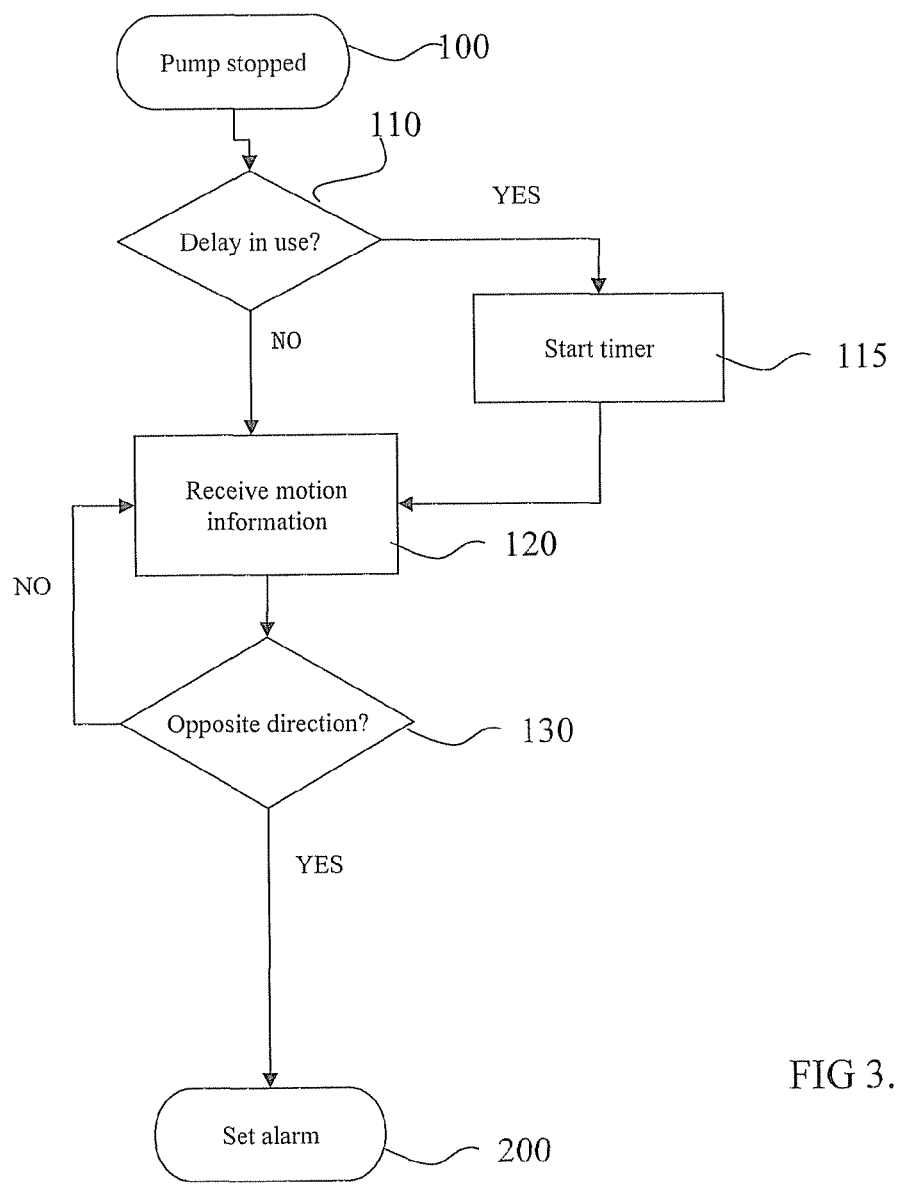
FIG. 3 shows a flow chart illustrating one embodiment of verifying a leak situation.

FIG. 3 is a flow chart illustrating one embodiment of verifying a leak situation. Leak monitoring is activated in a situation where the pump is kept stopped. Step 100 of stopping the pump does not need to be identified with sensors or the like, but the information can be obtained directly from the control unit. The control unit has the information on stopping the use of the pump, and this information can be utilized in starting the monitoring. Correspondingly, the start command of the pump use can be utilized as the termination command of the leak monitoring.

In step 110, selection is made about the use of the delay. The delay used is determined in a timer 115. The leak monitoring is not activated in connection with the stopping of the pump until after the delay. This is to give time to the non-return valve and the water mass between the valve and the pump to return to the initial point. The delay defined for the control unit can be changed by the user, whereby the system can be utilized in different assemblies and without undue alarms.

In step 120, motion information on the pump is received by the control unit of the frequency converter, and in step 130, the control unit identifies, on the basis of the motion information, the direction of operation of the pump with comparison means and indicates the leak situation to implement alarm in step 200. The alarm of step 200 is implemented if the direction of operation of the pump is, in the motion information, opposite to the direction of operation during the use of the pump.

Figure 4:
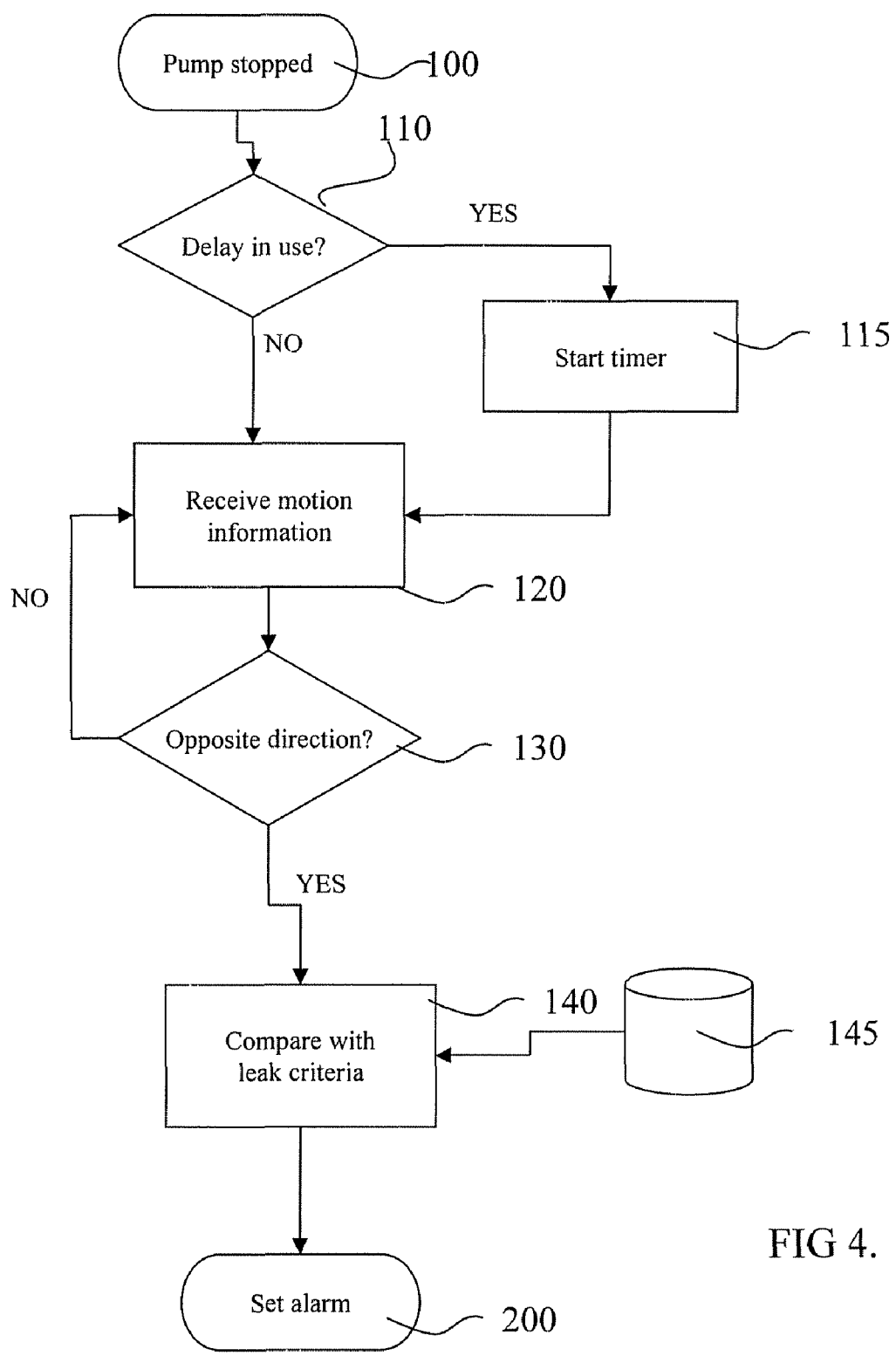
FIG. 4 shows a flow chart illustrating a second embodiment of verifying a leak situation.

FIG. 4 deviates from the functionality of FIG. 3 in that motion information defined in step 130 is compared with the leak criteria of a databank 145 in step 140. The alarm of step 200 is implemented only after the leak criteria predetermined in the databank have been met. Examples of the leak criteria include the speed of motion and the duration of motion, for example. A high speed of motion refers to a great leak, whereby the alarm must be implemented after shorter duration. The duration must be determined in such a way that a short-term reciprocating motion of the pump does not cause alarm. This is because in some cases there may be, at the point of the pump in the pipe system, reciprocating liquid motion generated by the other valves in the system being opened and closed.

Figure 5:
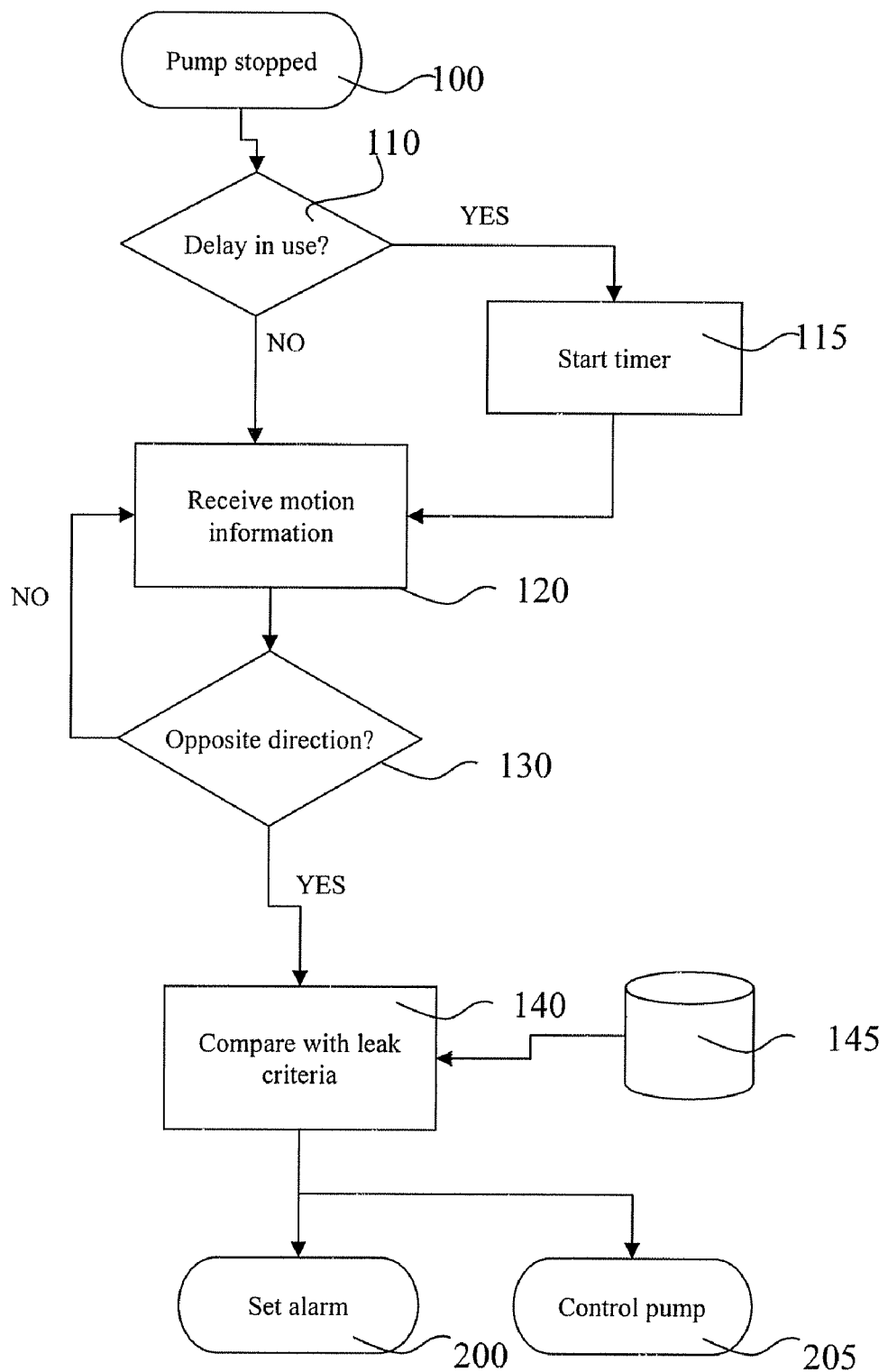
FIG. 5 shows a flow chart illustrating a third embodiment of verifying a leak situation.

FIG. 5 deviates from the functionality of FIG. 4 in that two operations are carried out after the leak situation verified in step 140, i.e. setting an alarm in step 200 and controlling the pump in step 205.

The pump is controlled by a control unit in such a way that normal starting of the pump is prevented in a situation where the pump is rotating in the opposite direction, i.e. in the leak direction. Preventing normal starting prevents the pump mechanism from breaking down.

Thus, the pump is controlled by the control unit in connection with an alarm in an alternative control manner. Alternatives of the pump control after the indication of the leak situation may be, for example:

1. control prevention, i.e. preventing the control of the pump completely (then the pump is still rotating in the opposite direction)
2. controlling the pump smoothly in such a way that the pump is prevented from rotating in the wrong direction (stopping the leak), whereby it can also be started in the pumping direction
3. carrying out alternative 2 and starting the pump in the pumping direction without the command of normal start-up.

Figure 6:
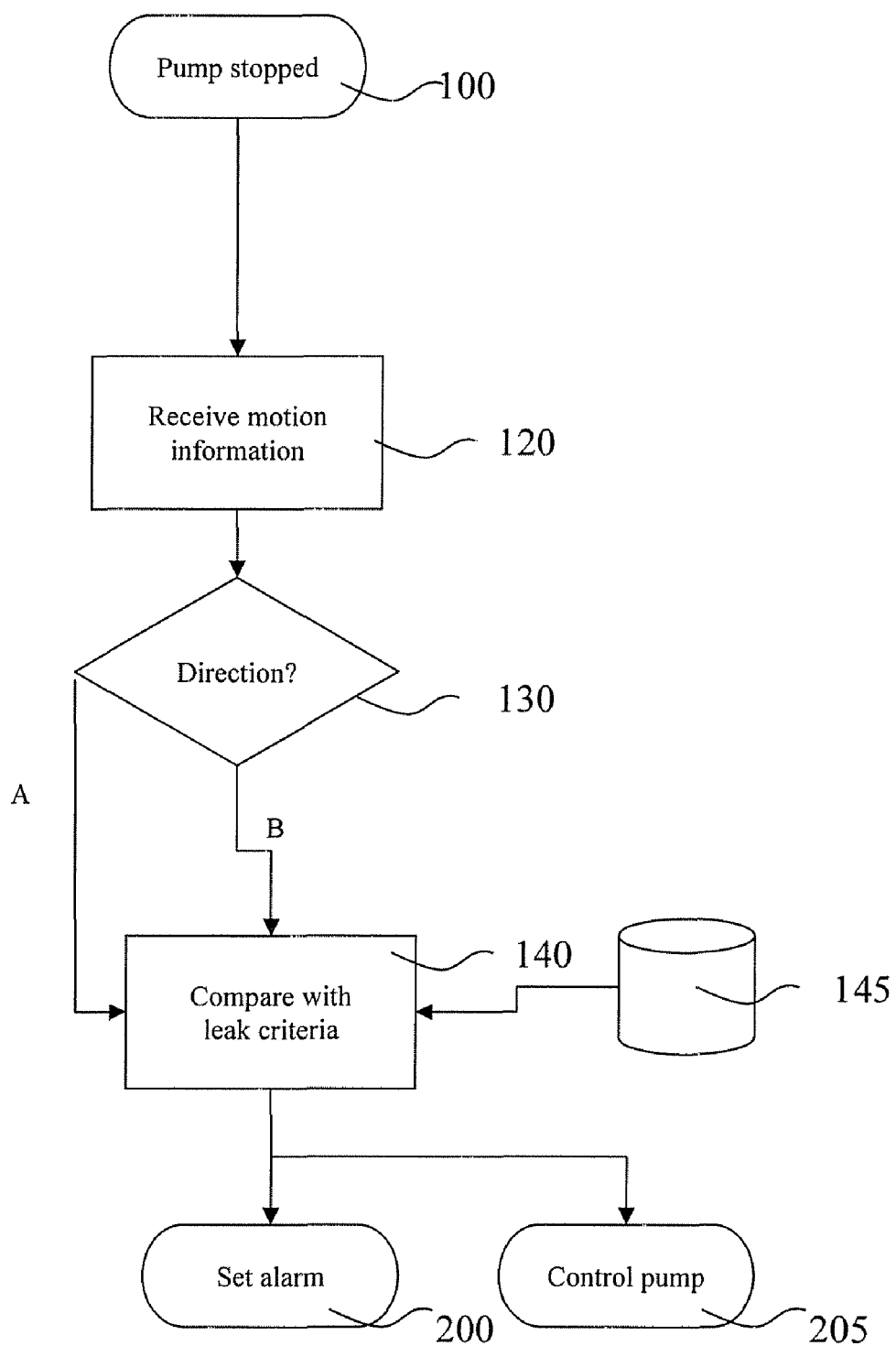
FIG. 6 shows a flow chart illustrating a fourth embodiment of verifying a leak situation.

FIG. 6 deviates from the functionality of FIG. 5 in that the motion information identified in step 130 is compared with the leak criteria in such a way that the motion of the pump is determined in both directions. Thus, the amount of liquid having flown in both directions can be determined on the basis of the direction, duration and speed of the motion. The alarm in step 200 and the possible pump control step 205 is implemented when the amount of flow is predetermined to be greater in the leak direction than in the pumping direction. In the solution according to FIG. 6, there is no need for the delay step 110 according to FIGS. 3 to 5 because the return flow after the pump has been stopped can be taken into account when setting the alarm limit. The embodiment according to FIG. 6 is a preferable solution for instance in a system having a lot of fluctuation.

It is apparent to a person skilled in the art that as the technology advances, the basic idea of the invention can be implemented in a plurality of ways. The invention and its embodiments are thus not restricted to the above examples but may vary within the scope of the claims.

The invention claimed is:

1. A method for verifying a leak situation in a liquid transfer system where liquid is transferred with a frequency-converter-controlled pump from a lower pressure to a higher pressure and where liquid is prevented from being transferred from a higher pressure to a lower pressure with one or more check valves positioned in a pipe system, the method comprising the steps of:

a) generating for the frequency converter motion information on the motion of the pump between the pumping operations;

(b) indicating a leak situation of the check valve if the direction of operation of the pump is, in the motion information, opposite to the direction of operation during the use of the pump.

2. A method according to claim 1, further comprising:
receiving the motion information generated in method step a) by a control unit of the frequency converter;
comparing the motion information with leak criteria predetermined for the control unit of the frequency converter; and
performing the indicating of step (b) if, in addition to the direction of operation of the pump, at least one leak criterion is fulfilled.

3. A method according to claim 2, wherein duration is one of the leak criteria, and a leak situation is indicated if motion opposite to the direction of operation during the use of the pump exceeds the duration determined for the control unit of the frequency converter.

4. A method according to claim 2, further comprising:
starting the comparison of the motion information in a delayed manner after a pumping operation has ended, i.e. after a predetermined delay.

5. A method according claim 1, further comprising:
using the pump in a frequency-converter-controlled manner between the pumping operations in such a way that motion opposite to the direction of operation during the use of the pump is prevented.

6. A method according to claim 5, wherein the pump is used in a frequency-converter-controlled manner in the direction of operation during the use of the pump.

7. A liquid transfer system, comprising
a pump arranged to transfer liquid from a lower pressure to a higher pressure;
a frequency converter arranged to control the pump;
one or more check valves positioned in a pipe system and arranged to prevent liquid from being transferred from a higher pressure to a lower pressure;
identifying means arranged to generate for the frequency converter motion information on the motion of the pump between the pumping operations of the pump; and
a control unit of the frequency converter, having comparison means arranged to generate alarm information to indicate a leak situation of the check valve if the direction of operation of the pump is, in the motion information, opposite to the direction of operation during the use of the pump.

8. A control unit of a frequency converter, comprising software means arranged to:
receive motion information on a frequency-converter-controlled pump between the pumping operations, the pump being arranged to transfer liquid in a pipe system comprising one or more check valves; and
indicate a leak situation of the check valve if the direction of operation of the pump is, in the received motion information, opposite to the direction of operation during the use of the pump.

* * * * *